United States Patent
Michaelis et al.

(10) Patent No.: US 7,451,302 B2
(45) Date of Patent: Nov. 11, 2008

(54) SYSTEM AND METHOD FOR MANAGING CONFIGURATION DATA FOR A MULTI-CELL COMPUTER SYSTEM

(75) Inventors: Scott Lynn Michaelis, Plano, TX (US); Greg Albrecht, Plano, TX (US); Jason Reasor, Frisco, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 612 days.

(21) Appl. No.: 10/797,530

(22) Filed: Mar. 10, 2004

(65) Prior Publication Data

US 2005/0216720 A1    Sep. 29, 2005

(51) Int. Cl.
*G06F 9/00*    (2006.01)
*G06F 15/177*  (2006.01)
(52) U.S. Cl. .............................. 713/2; 713/1; 713/100
(58) Field of Classification Search ............... 713/1, 713/2, 100
See application file for complete search history.

(56) References Cited

U.S. PATENT DOCUMENTS

| | | | |
|---|---|---|---|
| 5,170,472 A | | 12/1992 | Cwiakala et al. |
| 5,253,344 A | | 10/1993 | Bostick et al. |
| 5,414,851 A | | 5/1995 | Brice, Jr. et al. |
| 5,450,570 A | | 9/1995 | Richek et al. |
| 5,491,804 A | * | 2/1996 | Heath et al. ............ 710/7 |
| 5,574,914 A | | 11/1996 | Hancock et al. |
| 5,713,009 A | * | 1/1998 | DeRosa et al. ............ 713/2 |
| 5,784,702 A | | 7/1998 | Greenstein et al. |
| 5,996,026 A | * | 11/1999 | Onodera et al. ............ 710/3 |
| 6,343,324 B1 | * | 1/2002 | Hubis et al. ............ 709/229 |
| 6,438,671 B1 | * | 8/2002 | Doing et al. ............ 711/173 |
| 6,442,559 B1 | * | 8/2002 | Martinsen et al. ............ 707/102 |
| 6,457,008 B1 | * | 9/2002 | Rhee et al. ............ 707/10 |
| 6,535,998 B1 | | 3/2003 | Cabrera et al. |
| 6,567,841 B1 | * | 5/2003 | Rooney et al. ............ 718/104 |
| 6,633,916 B2 | | 10/2003 | Kauffman |
| 6,647,508 B2 | | 11/2003 | Zalewski et al. |
| 6,904,482 B2 | * | 6/2005 | Rietze et al. ............ 710/107 |
| 6,961,761 B2 | * | 11/2005 | Masuyama et al. ............ 709/220 |
| 6,973,447 B1 | * | 12/2005 | Aguilar et al. ............ 707/1 |
| 6,990,573 B2 | * | 1/2006 | Cherian et al. ............ 713/1 |
| 7,051,180 B2 | * | 5/2006 | Downer et al. ............ 711/173 |
| 7,065,761 B2 | * | 6/2006 | Foster et al. ............ 718/100 |
| 7,082,527 B2 | * | 7/2006 | Zimmer et al. ............ 713/2 |
| 7,143,024 B1 | * | 11/2006 | Goyal et al. ............ 703/21 |
| 7,184,945 B1 | * | 2/2007 | Takahashi et al. ............ 703/22 |
| 7,225,276 B2 | * | 5/2007 | Garnett et al. ............ 709/250 |
| 2002/0124040 A1 | | 9/2002 | Foster et al. |
| 2003/0069946 A1 | * | 4/2003 | Nair et al. ............ 709/220 |
| 2003/0084372 A1 | | 5/2003 | Mock et al. |
| 2004/0003063 A1 | | 1/2004 | Ashok et al. |
| 2004/0081104 A1 | * | 4/2004 | Pan et al. ............ 370/254 |
| 2004/0260936 A1 | * | 12/2004 | Hiray et al. ............ 713/200 |
| 2005/0055575 A1 | * | 3/2005 | Evans et al. ............ 713/201 |
| 2005/0076107 A1 | * | 4/2005 | Goud et al. ............ 709/223 |

* cited by examiner

*Primary Examiner*—Nitin C Patel

(57) ABSTRACT

According to at least one embodiment, a method of managing configuration data for a multi-cell computer system is provided. The method comprises storing configuration data for a given multi-cell computer system to nonvolatile memory of at least one cell of the given multi-cell computer system. The method further comprises storing a corresponding identifier to the nonvolatile memory of the at least one cell that uniquely identifies the given multi-cell computer system to which the stored configuration data corresponds.

35 Claims, 6 Drawing Sheets

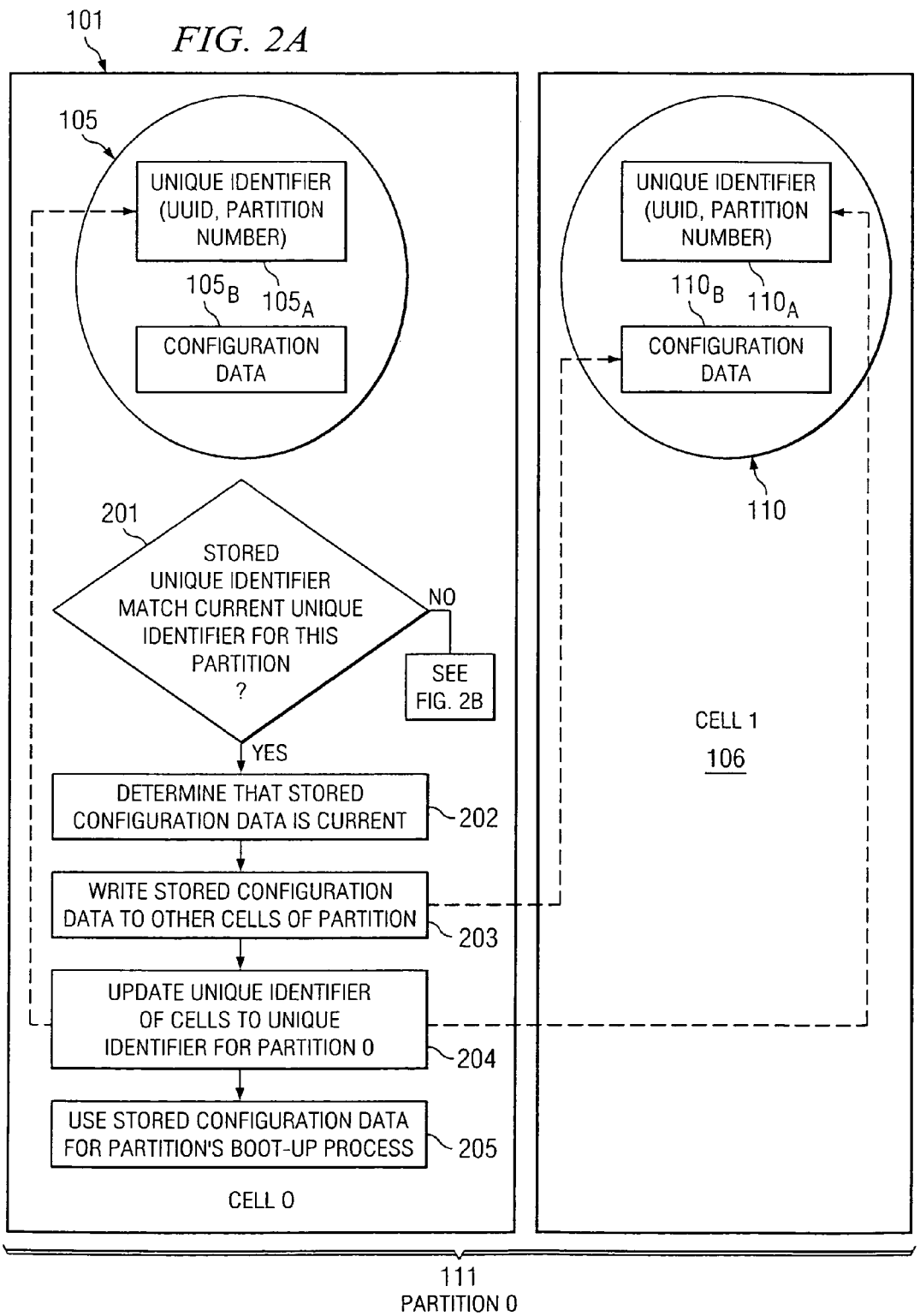

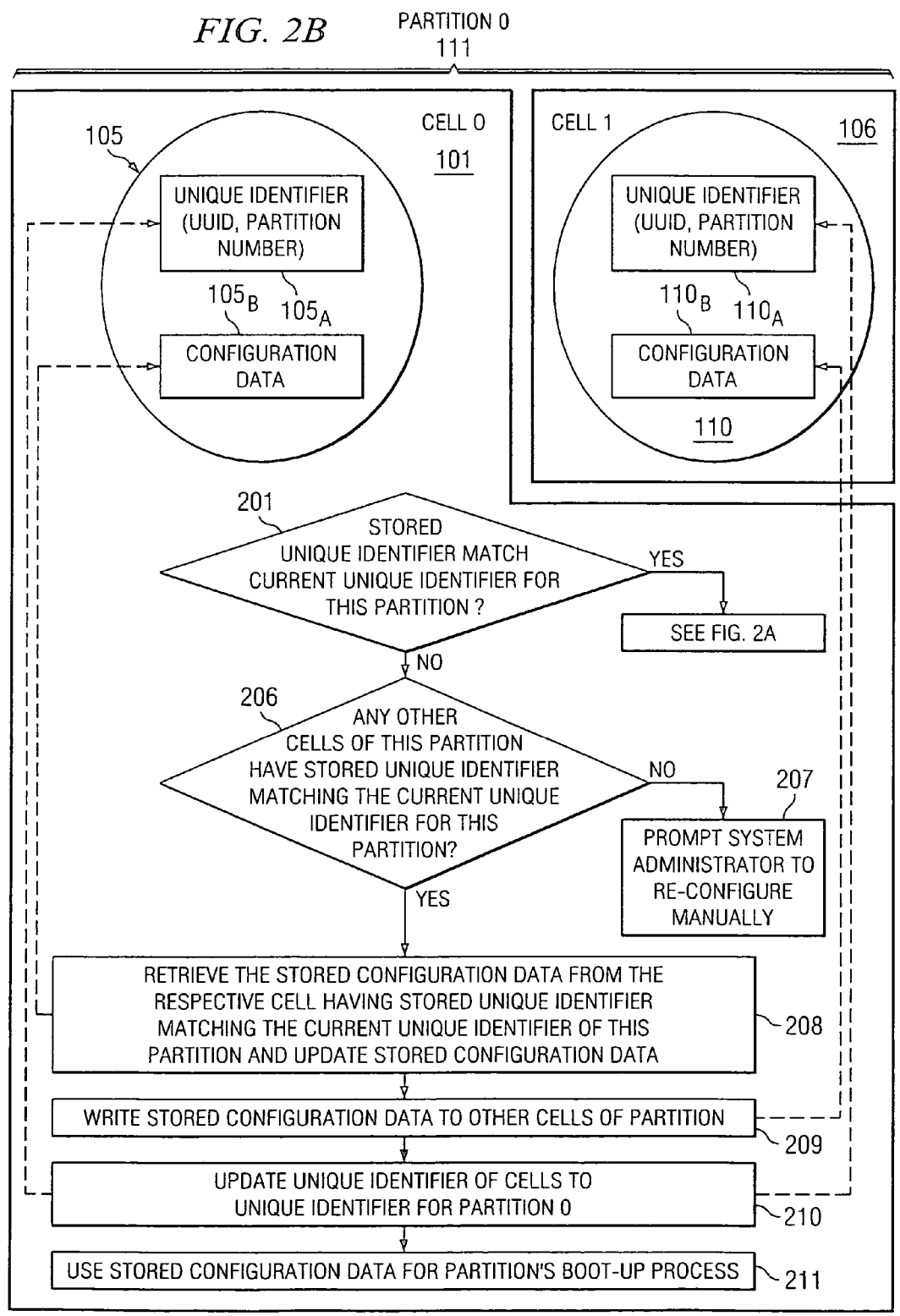

though the description relates in general to multi-cell
SYSTEM AND METHOD FOR MANAGING CONFIGURATION DATA FOR A MULTI-CELL COMPUTER SYSTEM

FIELD OF THE INVENTION

The following description relates in general to multi-cell computer systems, and more specifically to systems and methods for managing configuration data for a multi-cell computer system in which the cells included therein may change.

DESCRIPTION OF RELATED ART

The efficient operation of many applications in present computing environments often depends upon fast, powerful and flexible computing systems. The configuration and design of such systems has become very complicated when such systems are to be used in a commercial environment where there may be many separate departments, many different problem types, and continually changing computing needs. Multi-cell computing systems have been developed in which multiple cells that each comprise one or more processors (e.g., CPUs) and, in some instances other resources, such as memory, input/output ("I/O"), etc. are implemented within a system for supporting a given workload. For instance, various cells may cooperatively work together in supporting one or more applications running on the system.

A multi-cell system may be logically partitioned into various multi-cell partitions. For example, a multi-cell system having 16 total cells may be logically partitioned into four partitions that have four cells each. In general, logical partitioning is the ability to make a single multi-processing system run as if it were two or more independent systems. Each logical partition represents a division of resources in the system and operates as an independent logical system. Each partition is logical because the division of resources may be physical or virtual. Each partition generally provides an environment which may include multiple cells that are controlled by a common operating system ("OS"). For instance, a first OS may be executing for a first multi-cell partition, and a second OS may be executing for a second multi-cell partition. An example of logical partitions is the partitioning of a multi-cell computer system into multiple independent servers (e.g., for supporting different departments, hosting different websites, etc.), wherein each partition includes one or more cells (e.g., with each cell including its own processors, main storage, and I/O devices) and each partition forms a separate, independent server. A system administrator may configure the multi-cell system into logical partitions by assigning system resources to the desired partitions, for example.

The cells included in a given multi-cell system (e.g., within a given partition) may, from time-to-time, change. For instance, a new cell may be added, and/or one or more existing cells may be removed or replaced (e.g., in the case of a cell failure) within a given partition. Thus, difficulty arises in managing the configuration data for a given multi-cell system (e.g., a given multi-cell partition). It is undesirably burdensome on a system administrator to require that the configuration data for a given multi-cell system be manually re-configured when a change in its cells occurs.

BRIEF SUMMARY OF THE INVENTION

According to at least one embodiment, a method of managing configuration data for a multi-cell computer system is provided. The method comprises storing configuration data for a given multi-cell computer system to nonvolatile memory of at least one cell of the given multi-cell computer system. The method further comprises storing a corresponding identifier to the nonvolatile memory of the at least one cell that uniquely identifies the given multi-cell computer system to which the stored configuration data corresponds.

According to at least one embodiment, a method of managing configuration data locally within a partition of a multi-cell computer system is provided. The method comprises determining a unique identifier for a given partition of the multi-cell computer system, and determining if at least one cell in the given partition has an identifier stored to its respective nonvolatile memory that matches the determined unique identifier for the given partition. If determined that at least one cell of the given partition has a stored identifier matching the determined unique identifier for the given partition, the method further comprises using configuration data stored to that cell's nonvolatile memory for configuring the given partition.

According to at least one embodiment, a method comprises storing configuration data for a multi-cell computer system locally to nonvolatile memory of each of a plurality of cells. The method further comprises implementing the plurality of cells in a given multi-cell system, and determining if any of the cells possess the proper configuration data corresponding to the given multi-cell system.

According to at least one embodiment, a method of managing configuration data for a multi-cell system having a plurality of cells under the control of a common operating system is provided. The method comprises, during a boot-up process of the multi-cell system, a first cell determining whether it has stored in its non-volatile memory current configuration data for the multi-cell system. If determined that the first cell has the current configuration data, the first cell provides this stored configuration data to other cells of the multi-cell system and uses this stored configuration data for configuring the multi-cell system. If determined that the first cell does not have the current configuration data, the method further comprises determining if any cell of said multi-cell system has stored in its non-volatile memory the current configuration data for the system, and if determined that a cell of the multi-cell system has the current configuration data, then providing this configuration data to other of the cells of the multi-cell system and using this stored configuration data for configuring the multi-cell system.

According to at least one embodiment, a method comprises, during a first boot-up process of a multi-cell partition, distributing configuration data for the multi-cell partition to each of the cells of the multi-cell partition, wherein the configuration data is stored to non-volatile memory in each of the cells, and storing to the non-volatile memory of each cell a corresponding identifier that identifies that the configuration data corresponds to the multi-cell partition. The method further comprises, during a second boot-up process of the multi-cell partition, a first one of the cells included therein determining whether a unique identifier for the multi-cell partition matches with the first cell's stored identifier, wherein if the first cell's stored identifier matches the unique identifier of the multi-cell partition, then determining that the configuration data stored to non-volatile memory of the first cell is the current configuration data for configuring the multi-cell partition.

According to at least one embodiment, a system comprises a plurality of cells in a multi-cell system. Multiple ones of the cells include non-volatile memory to which are stored configuration data and a corresponding identifier that uniquely identifies a given multi-cell partition to which the cell's respective stored configuration data corresponds.

According to at least one embodiment, a system comprises non-volatile storage means, on each of a plurality of cells of a particular multi-cell partition, for storing configuration data. The system further comprises non-volatile storage means, on each of the plurality of cells, for storing an identifier that uniquely identifies a multi-cell system to which the cell's respective stored configuration data relates. The system further comprises means, on at least one of the plurality of cells, for determining if the configuration data stored to any of the plurality of cells relates to the particular multi-cell partition.

BRIEF DESCRIPTION OF THE DRAWINGS

FIGS. 2A-2B show operation of the cells of a partition, "Partition 0," of the example multi-cell system of FIG. 1 in accordance with one embodiment for managing configuration data for such partition;

DETAILED DESCRIPTION

Figure 1:
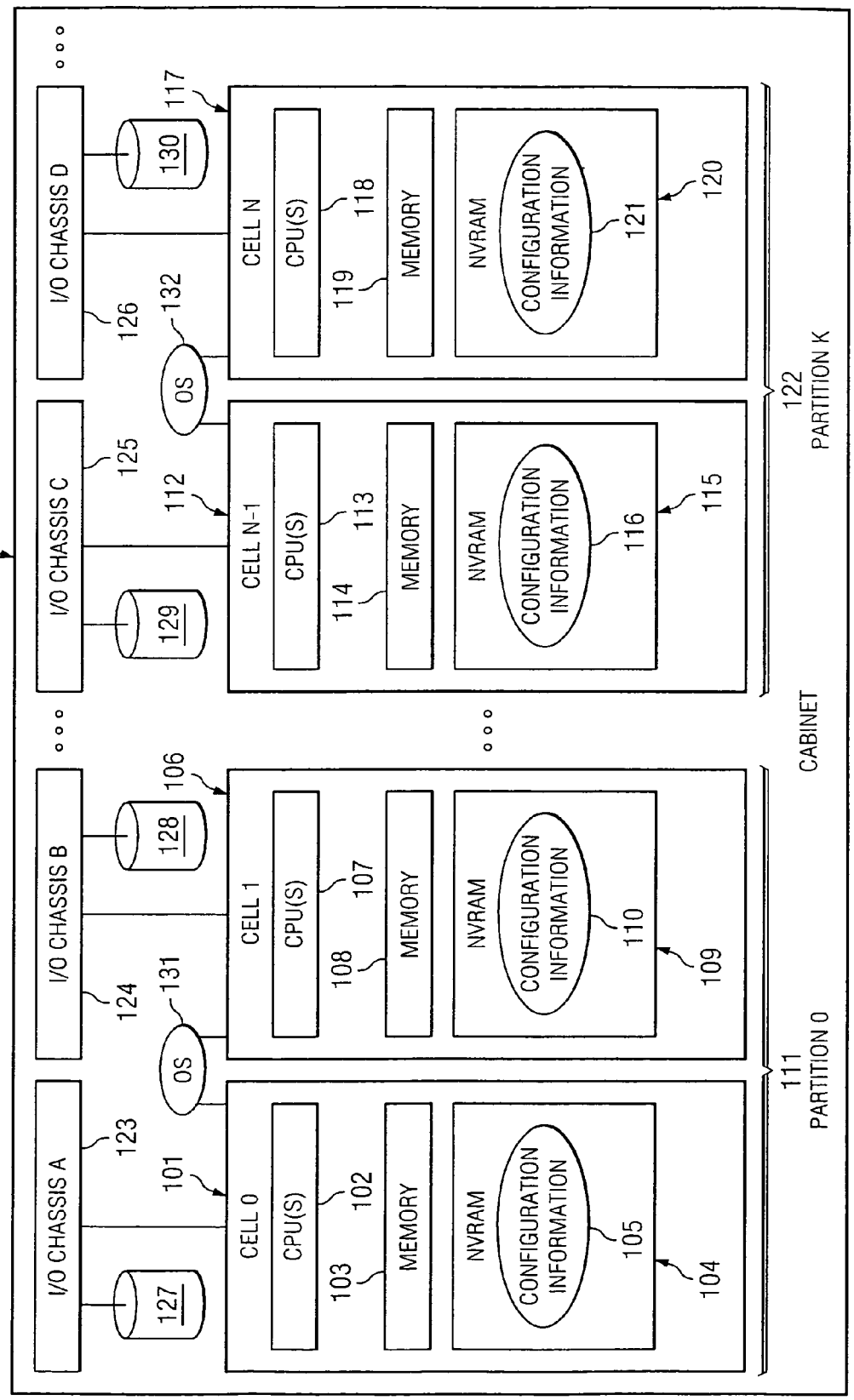
FIG. 1 shows an example multi-cell system adapted to manage configuration data in accordance with one embodiment.

Turning to FIG. 1, an example multi-cell system (or "multi-nodal system") 100 adapted to manage configuration data in accordance with one embodiment is shown. Multi-cell system (or "cabinet") 100 includes a plurality of cells (or "nodes"), such as Cell 0 (labeled 101), Cell 1 (labeled 106), Cell N-1 (labeled 112), and Cell N (labeled 117). Each cell includes one or more processors, such as CPU(s) 102 of Cell 0, CPU(s) 107 of Cell 1, CPU(s) 113 of Cell N-1, and CPU(s) 118 of Cell N. In certain implementations, the cells may additionally include other resources. For instance, in the example system 100, each cell includes memory resources, such as memory 103 of Cell 0, memory 108 of Cell 1, memory 114 of Cell N-1, and memory 119 of Cell N. In this regard, such memory resources may be any type of computer-readable data storage mechanism now known or later developed, including without limitation random access memory (RAM), read-only memory (ROM), magnetic and/or optical data storage mechanism (e.g., floppy disk drive, optical disc drive, etc.), as examples. While each of Cells 0-N are shown in this example system 100 as including the same components, in other implementations the cells need not include the same components but may instead each have different resources included thereon.

In the example system of FIG. 1, each cell includes an Input/Output (I/O) interface. For instance, Cell 0 is coupled to I/O chassis A (labeled 123), which enables communicative access to resources such as disk drive 127; Cell 1 is coupled to I/O chassis B (labeled 124), which enables communicative access to resources such as disk drive 128; Cell N-1 is coupled to I/O chassis C (labeled 125), which enables communicative access to resources such as disk drive 129; and Cell N is coupled to I/O chassis D (labeled 126), which enables communicative access to resources such as disk drive 130. In this example implementation, each I/O chassis corresponding to I/O devices (e.g., disk drives, network adapters, etc.) are physically coupled to a particular cell. Of course, in other implementations, such I/O chassis may be dynamically allocated to a cell (e.g., as may be defined via configuration information).

In this example implementation, each cell further includes nonvolatile memory resources (e.g., NVRAM), such as NVRAM 104 of Cell 0, NVRAM 109 of Cell 1, NVRAM 115 of Cell N-1, and NVRAM 120 of Cell N. As described further below, such nonvolatile memory resources of the cells are used in managing configuration data for a given multi-cell system (e.g., for a given partition). More specifically, configuration data for a corresponding multi-cell system (e.g., a corresponding partition) of which a cell is a member is stored to such cell's nonvolatile memory resource. For instance, in the example system 100 of FIG. 1, configuration information 105 is stored to NVRAM 105 of Cell 0; configuration information 110 is stored to NVRAM 109 of Cell 1; configuration information 116 is stored to NVRAM 115 of Cell N-1; and configuration information 121 is stored to NVRAM 120 of Cell N.

The cells of system 100 may be logically partitioned in certain implementations. For instance, in the example of FIG. 1, Cell 0 and Cell 1 are logically partitioned into a first partition, "Partition 0" (labeled 111), and Cell N-1 and Cell N are logically partitioned into a second partition, "Partition K" (labeled 122). While each partition is shown having two cells for ease of illustration in this example, in other implementations, partitions may have less or more than two cells. Further, the partitions may be implemented to include different numbers of cells. As shown, Partition 0 has a first operating system ("OS") 131 running thereon, and Partition K has a second OS 132 running thereon. OS 131 and OS 132 may each be different types of OSs (e.g., one may be Microsoft Windows™ while the other is Linux, etc.) or they may each be the same type of OS (e.g., different instances of the same OS).

While the entire multi-cell system 100 (or "cabinet") has "N" cells, a given partition may also be considered a multi-cell system. For instance, Partition 0 may be considered a multi-cell partition having its corresponding cells (e.g., Cell 0 and Cell 1 shown in FIG. 1). Thus, unless otherwise specifically designated, the term "multi-cell system" as used herein is intended to broadly refer to a system having any combination of cells. As an example, the term multi-cell system may refer to a partition having a plurality of cells. As another example, the term multi-cell may refer to a system (e.g., cabinet or complex) having a plurality of cells, wherein the cabinet may be either partitioned or unpartitioned. In the case in which a system is not partitioned, such system may be considered as a single partition. Thus, reference herein to a multi-cell system having at least one partition is intended to encompass a system that is not partitioned (wherein such system is effectively a single partition), as well as encompassing a system having its cells partitioned into a plurality of partitions. Accordingly, multi-cell system 100 of FIG. 1 having cells 0-N is referred to as a "multi-cell system." Further, a given partition, such as Partition 0 in FIG. 1, can itself be referred to as a "multi-cell system" that need not include cells outside such partition, such as the cells of Partition K in FIG. 1.

In one example architecture, multi-cell system 100 may include up to 16 cells, which may be partitioned into up to 16 different partitions. Of course, other architectures may be implemented that allow any number "N" of cells which may be partitioned into any number "K" of different logical partitions.

For a given multi-cell system (e.g., a given partition), configuration information may be used for specifying the configuration of such multi-cell system, including as an example identification of resources available to the multi-cell system, etc. As mentioned above, a system administrator may configure the multi-cell system into logical partitions by assigning system resources to the desired partitions, for example. In many traditional systems, once system power is interrupted, however, either expectedly or unexpectedly, the configuration is lost, requiring the system administrator to manually reconfigure all of the logical partitions once again. Accordingly, a desire has arisen for a system and method for managing the configuration of the system resources allocated to each logical partition and to have that configuration data be persistent across system power cycles.

One solution is to have configuration data maintained for a multi-cell system in an external utility processor. For example, configuration data for each of a plurality of different logical partitions may be maintained in a utility processor that is external to each of the different partitions. As an example, published U.S. Patent Application No. 2002/0124040 titled "NONVOLATILE LOGICAL PARTITION SYSTEM DATA MANAGEMENT," proposes using such an external utility processor scheme (which refers to the external utility processor as a "Control Service Processor" (or "CSP")). However, this solution is problematic in that the external utility processor presents a single point of failure. For instance, if the external utility processor fails, the configuration data is lost for all of the logical partitions.

Thus, it may be desirable to maintain the configuration data local within each respective multi-cell system (e.g., within each partition) such that if configuration data is lost for one partition it does not necessarily result in loss of configuration data for other partitions. For instance, configuration data for a given multi-cell system (e.g., a given partition) may be stored to nonvolatile memory on one or more cells of such multi-cell system, such as the configuration information 105, 110, 116, and 121 stored to Cells 0-N, respectively, in the example of FIG. 1.

Further complicating management of configuration data, however, in many cases the cells making up a multi-cell system (e.g., a given partition) may change from time-to-time. For instance, a new cell may be added, and/or one or more existing cells may be removed or replaced (e.g., in the case of a cell failure). Thus, difficulty arises in managing the configuration data for a given multi-cell system (e.g., a given multi-cell partition). For example, suppose that configuration data is stored to nonvolatile memory of only one of the cells of a given partition; in this case, if that one cell fails or is replaced, the proper configuration data is lost for the given partition, thus requiring manual reconfiguration by the system administrator. As another example, suppose that configuration data is stored to nonvolatile memory of a plurality of different cells of a given partition (e.g., stored to all cells of the partition); in this case, if a new cell is added to the partition or one of the cells of the partition is replaced with another cell, the newly added cell may include conflicting configuration data in its nonvolatile memory, and thus the partition may not be sure which cell's configuration data to be used in configuring itself.

As with the example multi-cell system 100 of FIG. 1, certain embodiments described herein utilize a local management technique in that configuration data is managed locally within a given multi-cell system (e.g., within a given partition), rather than being managed external to the given multi-cell system, such as with an external utility processor. More specifically, in certain embodiments, the cells of a given multi-cell system are used for managing the system's configuration data. For instance, Cell 0 and Cell 1 of Partition 0 in the example system 100 of FIG. 1 are used to manage configuration data (e.g., configuration information 105 and 110) for Partition 0, while Cell N-1 and Cell N of Partition K are used to manage configuration data (e.g., configuration information 116 and 121) for Partition K.

As described further below, in certain embodiments, corresponding data is maintained for stored configuration data within a cell that uniquely identifies the given multi-cell system (e.g., given partition) to which the stored configuration data relates. For instance, in certain implementations, corresponding identifier data is stored to a cell that uniquely identifies a given multi-cell system in which the cell was a member when receiving/storing its respective configuration data. Accordingly, when configuring a given multi-cell system, a cell of such system can compare its stored identifier with its current identifier to determine whether its stored configuration data corresponds to this multi-cell system. That is, the identifier data can be used to determine whether the cell's configuration data is configuration data for the multi-cell system in which the cell is currently a member.

Typically, it is desirable to preserve, unaffected, system configuration information when other system configuration changes. In a multi-cell environment this can be difficult as system resources may appear or disappear as the system configuration evolves. For example, a system administrator may configure a certain disk to be the boot disk for a given multi-cell system (e.g., for a given multi-cell partition). As long as that disk is present in the given multi-cell system, the administrator always wants that disk to be read for loading the OS to main memory. The administrator wants this behavior regardless of what new hardware gets added to the system, replaced in the system, or removed from the system (i.e., as long as that disk is present, that is the one to boot from). As another example, the configuration may specify certain tests to skip when booting the given multi-cell system. The administrator may desire to skip write/read memory tests on every boot because of the additional time this requires when booting the given multi-cell system, for instance. The administrator typically wants this behavior to be consistent no matter what hardware is added, replaced or removed in the given multi-cell system.

As mentioned above, this kind of configuration information can be stored in nonvolatile memory (e.g., NVRAM) in the system such that it is persistent boot after boot and even if the system is powered off. This allows for consistent behavior across boots or power cycles.

In large, multi-cell systems, however, there is more than 1 of each resource, including nonvolatile memory. For instance, each cell in the system may include nonvolatile memory to which configuration data may be stored, as described above in connection with the example system of FIG. 1. This prevents any one resource from being a single point of failure and also allows the multi-cell system to be divided up into partitions, such as Partition 0 and Partition K of FIG. 1. Each partition may have its own (local) copy of its respective system configuration information, which may be different for each partition. As in the example of FIG. 1, each cell in the large system may have its own NVRAM resource in which the system configuration information for its respective multi-cell system (e.g., its respective partition) is kept.

A multi-cell system, such as the multi-cell system 100 of FIG. 1, may be referred to as a complex. In accordance with one embodiment described herein, each complex has a universally unique identifier ("UUID") that can be used for tracking the system and for licensing purposes. That is, each complex is assigned a unique identifier such that it can be distinguished from all other complexes. Such UUID may be assigned to the complex, for example, by the manufacturer at the time the complex is manufactured. Such UUID may be, for example, a unique serial number that is assigned to each complex. Partitions made up of cells within a given complex are uniquely numbered within the complex, but are not necessarily uniquely numbered universally. For example, two partitions in separate complexes may both be designated as partition number 4. Thus, the combination of the UUID for a complex and the partition identifier within such complex provides a universally unique identifier for such partition. That is, the UUID uniquely identifies the given complex and the partition identifier uniquely identifies a given partition within the given complex.

Figure 4:
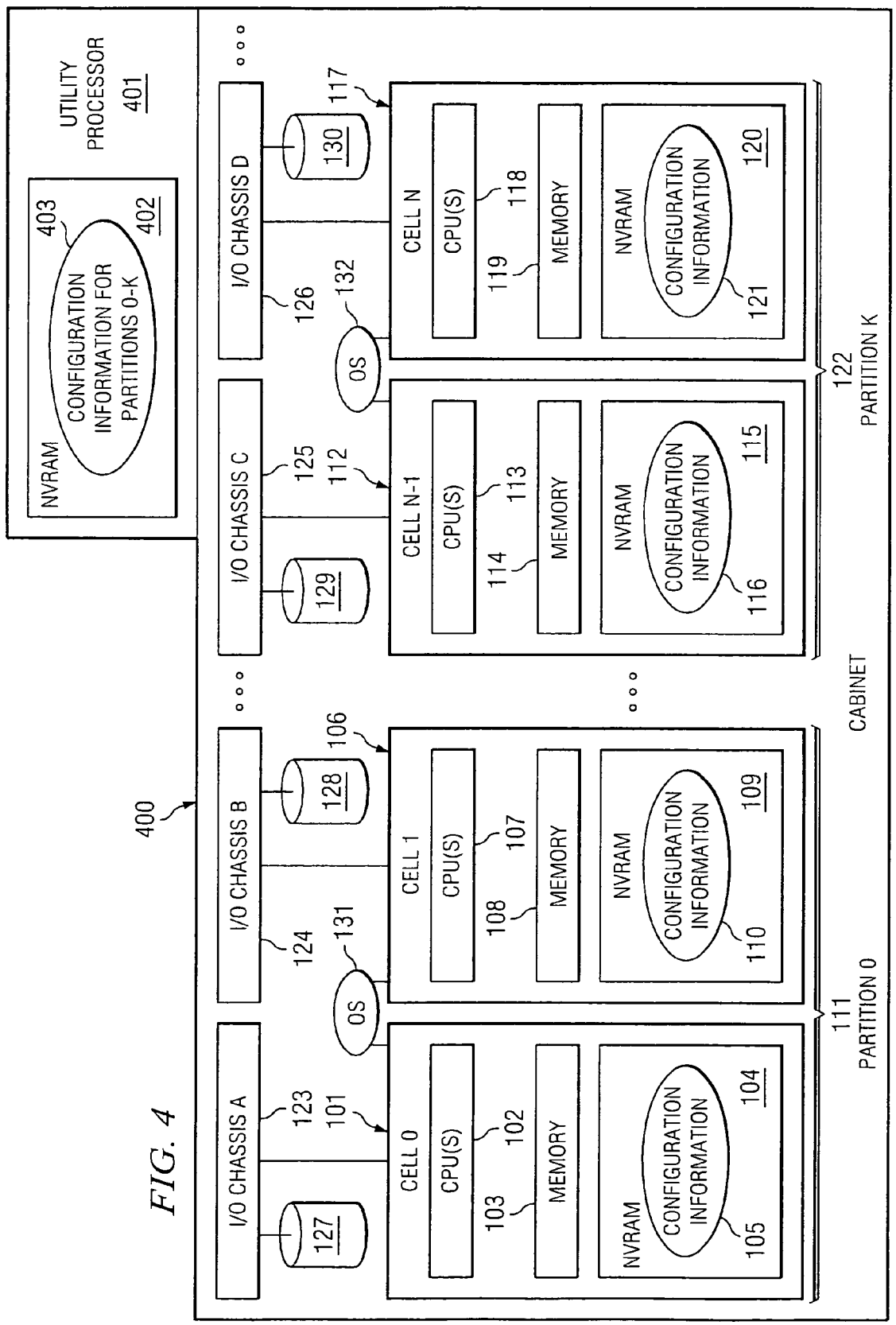
FIG. 4 shows an example multi-cell system adapted to implement a configuration data management technique in accordance with one embodiment.

In accordance with one embodiment, the UUID number for a complex is entered into a utility processor, such as utility processor 401 of FIG. 4, when the system is being configured for a customer. This UUID is stored in NVRAM on the utility processor. On each cell in the system, there is a portion of NVRAM reserved for the utility processor. The first time a system is powered on, the utility processor pushes the UUID out into NVRAM on each of the system's cells. Later, if the utility processor determines that its local NVRAM becomes corrupt, it checks the NVRAM on all of the system's cells in attempt to determine what the UUID of the complex should be. If there is a consensus among the cells, the utility processor uses that number for the UUID. If there is no consensus among the cells, the utility processor stops everything until a service person can enter the UUID again (e.g., the UUID is typically printed on a sticker on the cabinet). Additionally, each time firmware on a cell queries the utility processor for the UUID, it stores it in the NVRAM under system firmware control. Thus, if the utility processor fails on the next boot, system firmware will use its "cached copy" of the UUID. Accordingly, after the initial system boot, the utility processor is not a single point of failure regarding the UUID. This example embodiment does not support a customer reconfiguring the system with the utility processor in a failed state (i.e., the customer is not allowed to move a cell from one slot to another if the utility processor is not operational). Of course, other techniques now known or later developed may be employed for maintaining the UUID for a system in alternative embodiments.

In one embodiment, the assignment of a partition number within a complex is handled in a manner similar to that described in the above example embodiment for assigning the UUID of a complex. In this embodiment, each cell's "partition assignment" is kept in NVRAM on the utility processor and in the NVRAM on the cell board. If the utility processor determines its NVRAM is not reliable, it consults the NVRAM on the cell boards. If there is a consensus, it adopts the cell partition assignments that are on the cell boards and rewrites its own NVRAM. If there is no consensus among the cells, the utility processor will not boot the complex and prompts the administrators with an error and asks that they reconfigure the complex. To get the same configuration back, the administrators would have to remember it (or have it recorded offline). Again, if the utility processor is not functioning, system firmware will have access to its local NVRAM copy of the assignments. Thus, in this example embodiment, for either the UUID or the partition number information to be lost, there would have to be failures on both the utility processor (or in its NVRAM) and in the NVRAM on the cell boards. This represents a dual-point of failure. Of course, other techniques now known or later developed may be employed for maintaining the partition number assignment within a complex in alternative embodiments.

In accordance with one embodiment, if a partition consists of only 1 cell, it consults the only NVRAM component in that cell to determine its respective configuration information. In this case, there is no ambiguity. However, ambiguity may arise when there are two or more cells in a partition each having different system configuration information for the partition. For example, suppose that within complex 100 of FIG. 1, Cell 0 in Partition 0 has configuration information 105 stored to its NVRAM 104 that specifies the boot disk for Partition 0 is disk 0, and suppose Cell N in Partition K has configuration information 121 stored to its NVRAM 120 that specifies the boot disk for Partition K is disk 1. Now, further suppose the system administrator decides to combine Cell N with Cell 0 into Partition 0. When Partition 0 boots, it has the boot disk 0 specified in Cell 0's NVRAM and boot disk 1 specified in Cell N's NVRAM. There is an ambiguity over which is really the boot disk for Partition 0.

As described further below, certain embodiments for managing the configuration information for a given multi-cell system provide local handling of the configuration information within the given multi-cell system (e.g., within a given partition). Further, in certain embodiments the configuration information is stored to the nonvolatile memory of a plurality of different cells (e.g., all cells) of a given multi-cell system, and the configuration information is managed in a manner that is capable of resolving ambiguities that may exist between the different cells, such as the ambiguity between Cell 0 and Cell N in the above example. Certain embodiments of managing the configuration data are advantageous in that if any of the cells in the given multi-cell system (e.g., the given partition) have valid configuration data from the last time such given multi-cell system (e.g., partition) was booted, such valid configuration data will be discovered and used for the current boot. Further, the valid configuration data is, in certain embodiments, distributed to all other cells of this given multi-cell system (e.g., partition) such that as long as any one of those cells remain in this given multi-cell system for the next boot, the proper (current) configuration information will remain available to the system. Accordingly, in certain embodiments, the system configuration information will be preserved as long as at least one cell in the system remains from one boot to the next boot. As described further below, certain embodiments also make use of an external utility processor for preserving the configuration information in the typically rare event that all cells of a given multi-cell system (e.g., a given partition) are replaced from one boot to the next.

Turning to FIGS. 2A-2B, operation of the cells of Partition 0 of FIG. 1 in accordance with one embodiment for managing configuration data for such Partition 0 is shown. As shown, in this example embodiment, configuration information 105 stored to NVRAM of Cell 0 includes Configuration Data 105$_B$ and a corresponding unique identifier 105$_A$. Similarly, configuration information 110 stored to NVRAM of Cell 1 includes Configuration Data 110$_B$ and a corresponding unique identifier 110$_A$. In this example implementation, Configuration Data 105$_B$ and 110$_B$ each include, but are not limited to, information identifying a boot path (e.g., identification of a device from which to load the OS), information identifying which device to use as a system console, and information identifying what tests to run when booting up. The unique identifiers 105$_A$ and 110$_A$ each uniquely identify the particular multi-cell system (e.g., the particular partition) in which their respective cell was a member when receiving the corresponding stored Configuration Data 105$_B$ and 110$_B$.

In this example implementation, the identifiers $105_A$ and $110_A$ are each formed as a combination of a corresponding UUID and partition number.

In this example, Cell 0 is designated a "root" cell for Partition 0. A preferred root cell can be designated, for instance, by the system administrator. If this preferred cell is designated and has the proper I/O equipment attached (e.g., a console device), the designated cell will be selected as the root cell. If no preferred root cell is specified by the administrator (or if the specified root cell does not possess the proper I/O equipment), the lowest numbered cell present in the partition that has the required I/O equipment will be determined by the partition and designated as its root cell. Further, while a "root" cell is designated in this example embodiment, in other embodiments the management of configuration data is performed without designating a root cell (e.g., using a Round-Robin approach for checking each cell's configuration data until determined that one having the current configuration data is discovered).

As shown in FIG. 2A, during the boot-up process of Partition 0, root Cell 0 determines, in operational block 201, whether its stored identifier $105_A$ matches the current identifier for this partition. That is, when Partition 0 boots, it calculates a corresponding unique identifier, which in this example is formed as a combination of the complex UUID and the partition number within the complex (which results in a universally unique number across all complexes). As mentioned above, the complex UUID and partition number may, in one embodiment, be stored to a utility processor's NVRAM (which may push that information to NVRAM of each cell), and thus the cell can access this information for calculating the unique identifier. If stored identifier $105_A$ matches the current identifier calculated for this Partition 0, then Cell 0 determines, in block 202, that its stored configuration data $105_B$ is current (or "proper") for this Partition 0. In other words, because Cell 0 was a member of this Partition 0 when it received configuration data $105_B$ (as indicated by its unique identifier $105_A$ matching the current identifier for this partition), Cell 0 determines that such stored configuration data $105_B$ is the actual configuration data corresponding to Partition 0. Software, hardware, and/or firmware components may be implemented, as examples, within Partition 0 (e.g., on Cell 0) for calculating the unique identifier of Partition 0 and determining whether the corresponding stored identifier $105_A$ matches such calculated unique identifier. In operational block 203, Cell 0 writes its stored configuration data $105_B$ to the other cells of Partition 0. For instance, Cell 0 writes its stored configuration data $105_B$ to Cell 1 so that Cell 1's stored configuration data $110_B$ corresponds to Cell 0's configuration data $105_B$.

In operational block 204, Cell 0 updates the unique identifier for the member cells of Partition 0 to the calculated identifier for Partition 0. Thus, unique identifiers $105_A$ and $110_A$ are updated to reflect that the corresponding configuration data $105_B$ and $110_B$ is proper for this Partition 0. Accordingly, by having this updated configuration data and unique identifier stored to each cell of Partition 0, if one of the cells (e.g., root Cell 0) is replaced for a subsequent boot process of Partition 0, the proper configuration data remains available and identifiable in the cells that were not replaced. In operational block 205, the stored Configuration Data $105_B$ is used in the partition's boot-up process for properly configuring such Partition 0.

If root Cell 0 determines in block 201 that its stored unique identifier $105_A$ does not match the calculated identifier for Partition 0, then its operation in this example embodiment advances to block 206 of FIG. 2B. In operational block 206, root Cell 0 determines whether any other cells of this Partition 0 have a stored unique identifier that matches the calculated identifier for this Partition 0. For instance, root Cell 0 determines whether Cell 1's stored identifier $110_A$ matches the calculated identifier of Partition 0. If no member cell of Partition 0 has a stored identifier that matches the calculated identifier of Partition 0, indicating that no current member cell of Partition 0 was a member of Partition 0 during its previous boot process, then in this example embodiment root Cell 0 generates, in block 207, an output message (e.g., on a console) to prompt the system administrator to re-configure Partition 0 manually. In other implementations, action other than prompting the system administrator to re-configure the partition manually may be taken, such as resorting to a default configuration or accessing an external utility processor for configuration information (such as described further below). On the other hand, if another member cell of Partition 0 has a stored identifier (e.g., identifier $110_B$ of Cell 1) that matches the calculated identifier of Partition 0, indicating that it was a member of Partition 0 during a previous boot process in which it received its respective stored configuration data (e.g., stored configuration data $110_A$ of Cell 1), then Cell 0 retrieves the stored configuration data from such member cell and updates stored configuration data $105_B$ with such retrieved configuration data, in operational block 208.

In operational block 209, Cell 0 writes this newly stored configuration data $105_B$ to the other cells of Partition 0. For instance, Cell 0 writes its stored configuration data $105_B$ to Cell 1 so that Cell 1's stored configuration data $110_B$ corresponds to Cell 0's updated configuration data $105_B$. In certain implementations, the configuration data is not written back to the cell from which it was obtained. That is, once a cell is identified as having the proper configuration data (e.g., based on its stored identifier matching the calculated identifier for this partition), the configuration data need not be written back to such cell. In certain implementations, the determined proper configuration data is written only to those cells (if any) that do not already possess the proper configuration data (e.g., that do not have a stored identifier matching the calculated identifier for this partition).

In operational block 210, Cell 0 updates the identifier for the member cells of Partition 0 to the unique identifier calculated for Partition 0. Thus, identifiers $105_A$ and $110_A$ are updated to reflect that the corresponding configuration data $105_B$ and $100_B$ is proper for this Partition 0. Again, in certain implementations the unique identifier for Partition 0 is not written to those member cells that already possess it (as their "stored identifier"), but instead such unique identifier for Partition 0 may be written only to those member cells that have a different stored identifier. Thus, in certain implementations the configuration data and stored identifier may be updated only for those member cells that do not already possess the proper configuration data and unique identifier for Partition 0. In operational block 211, the stored Configuration Data $105_B$ is used in the partition's boot-up process for properly configuring such Partition 0.

Figure 3:
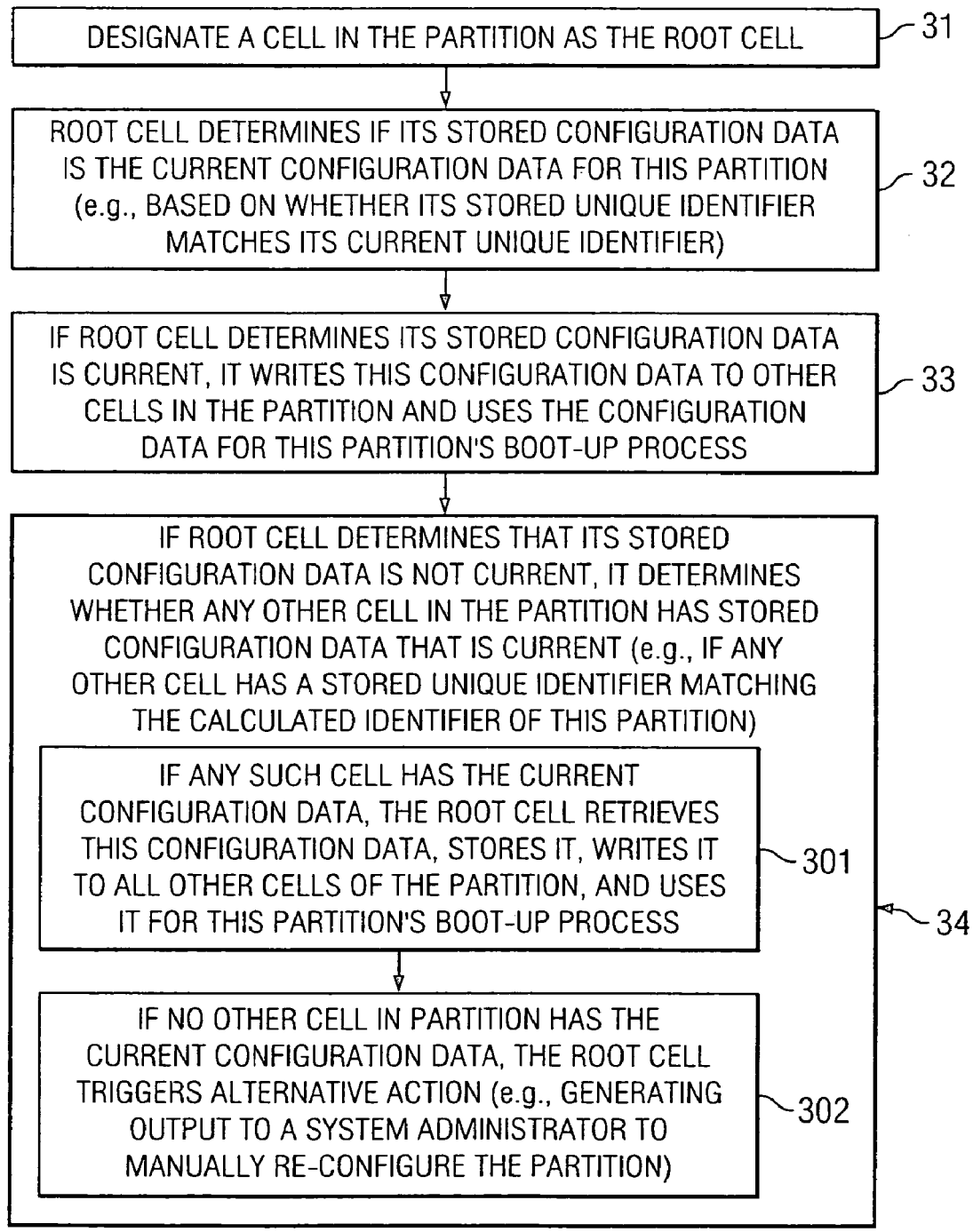
FIG. 3 shows an operational flow diagram for the example embodiment of FIGS. 2A-2B.

Turning to FIG. 3, an operational flow diagram for the example embodiment of FIGS. 2A-2B is shown. In operational block 31, a cell in a given partition (e.g., Partition 0 in FIGS. 2A-2B) is designated as a root cell. In operational block 32, the root cell (e.g., Cell 0 in FIGS. 2A-2B) determines if its stored configuration data (e.g., configuration data $105_B$ in FIGS. 2A-2B) is the current configuration data for this partition (e.g., based on whether its stored unique identifier $105_A$ matches the calculated identifier for this partition). In block 33, if the root cell determines its stored configuration data is current, it writes this configuration data to other cells in the partition and uses the configuration data for this partition's boot-up process. In block 34, if the root cell determines that its stored configuration data is not current, it determines whether any other cell in the partition has stored configuration data that is current (e.g., if any other cell has a stored unique identifier matching the calculated unique identifier for this partition). In block 301, if any such cell has the current configuration data, the root cell retrieves this configuration data, stores the retrieved configuration data to its nonvolatile memory, writes the retrieved configuration data to all other cells of the partition, and uses the retrieved configuration data for this partition's boot-up process. If, on the other hand, no other cell in the partition has the current configuration data, the root cell triggers, in block 302, alternative action (e.g., generating output to a system administrator to manually re-configure the partition).

In view of the above, certain embodiments for managing configuration data locally within a multi-cell system (e.g., within a partition) resolves the ambiguity of having conflicting configuration data in multiple cells' nonvolatile memory. While the above example embodiment of FIGS. 2A-2B and 3 utilize a designated root cell in its management of configuration data, other embodiments do not utilize such a designated root cell. For instance, in an example implementation of one embodiment, each time a partition boots, it calculates a Partition ID, which is a combination of the complex UUID combined with the partition number within the complex. This is guaranteed to be a universally unique number in this example implementation. Of course, in other implementations, a lower level of uniqueness may be desired for the identifier of a given multi-cell system (e.g., a given multi-cell partition). For instance, rather than providing a universally unique number that is guaranteed unique across all complexes, in certain implementations the unique identifier of a multi-cell system may be unique for a given domain (e.g., within a given company) in which cells are likely to be interchanged. When system configuration information needs to be consulted for such partition, the calculated Partition ID is compared with a copy of the Partition ID that is stored in NVRAM of a first member cell from the previous boot. If they match, then the NVRAM component that is being examined is determined to be in this exact partition the last time the system was booted and its NVRAM contents have valid system configuration information for this partition.

If the calculated Partition ID and the stored Partition ID (in NVRAM of a member cell) are different, then the node associated with this NVRAM component is determined to not have been in this partition on the last successful boot and its contents do not apply to this partition and can be ignored. The partition goes to the next NVRAM component and performs the same Partition ID match test to determine if the system configuration information on that partition applies to the current partition. This may continue until valid system configuration information for this partition is found.

Once valid system configuration information for the partition is found on a member cell, the calculated Partition ID is then pushed out to the NVRAM components of all cells in the partition and becomes the stored Partition ID of those cells during the next boot process in which they are involved, according to one embodiment. The system configuration information that was determined to be valid for this partition is also copied to the NVRAM components of all cells in the partition. Thus, while the example embodiment of FIGS. 2A-2B and 3 utilize a designated "root" cell, other embodiments may not designate a root cell, but may instead use a round-robin approach, for example, to check the cells of a partition to determine if any of the cells have the proper configuration data for the partition, and once any cell is discovered as possessing the proper configuration data it writes the data to the other cells of the partition and uses the configuration data for configuring the partition.

The above-described example configuration data management techniques are advantageous because they do not have a single point of failure within a multi-cell partition or within the collection of partitions. Within each partition having multiple cells, the configuration data is stored across multiple different cells locally. Thus, if configuration data is lost on one cell, it can be retrieved from another. Within the entire multi-partition system (complex), if the configuration data is lost for one partition (e.g., because all cells were replaced) this does not necessarily result in lost configuration data for any other partitions.

Further, the burden placed on a system administrator for manually re-configuring a multi-cell system is significantly reduced. For instance, various changes in cells may be made within a given multi-cell system (e.g., within a given partition) without the corresponding configuration data being lost. For example, suppose that the example system of FIG. 1 boots-up during a first boot process in which the configuration data for Partition 0 is stored to nonvolatile memory of that partition's member cells, Cell 0 and Cell 1 and in which the configuration data for Partition K is stored to nonvolatile memory of that partition's member cells, Cell N-1 and Cell N. Now suppose that Cell N is moved to Partition 0 and Partition 0 is re-configured (e.g., re-booted). Using the management technique of the above-described example embodiments, the ambiguity between configuration information 121 in Cell N's NVRAM 120 and the configuration information 105 and 10 in the NVRAM of Cells 0 and 1 is resolved without requiring any manual intervention on the part of the system administrator. Suppose instead that either of Cell 0 or Cell 1 is removed and replaced with another Cell (such as Cell N); when Partition 0 is re-configured (e.g., re-booted) the management technique of the above-described example embodiments resolves any ambiguity that may exist between the configuration information of the previously existing cell of Partition 0 and the newly added cell without requiring any manual intervention on the part of the system administrator.

Suppose, however, that all cells of a partition are replaced. For instance, suppose that both of Cells 0 and 1 of Partition 0 in FIG. 1 are replaced. The example management technique of FIGS. 2A-2B and 3 then directs the system administrator to manually re-configure this partition (e.g., in operational block 207 of FIG. 2B or operational block 302 of FIG. 3). Such a scenario is typically rarely encountered, and thus such a limited situation in which a system administrator is called upon to manually re-configure the partition is typically acceptable. However, an external utility processor may be used in combination with the above-described local management techniques to further aid in maintaining configuration data in the event that all cells are replaced, such as described further below in connection with the example embodiment of FIGS. 4 and 5.

Turning to FIG. 4, an example embodiment of a multi-cell system 400 is shown. Multi-cell system 400 includes Cells 1-N that are partitioned into Partitions 0-K, as described above with the example system 100 of FIG. 1. In this example, utility processor 401 is further included, which has corresponding nonvolatile memory (e.g., NVRAM) 402 to which configuration information 403 for Partitions 0-K is stored. In this example embodiment of configuration data management, configuration data for each partition is not only stored locally to the nonvolatile memory of the cells of each partition, but is also stored to NVRAM 402 of external utility processor 401.

In this sense, such utility processor 401 is considered "external" to a given partition because it is not a member cell of that given partition. For instance, when proper configuration data is identified by a cell of a partition, it not only writes such proper configuration data to the other cells of the partition but also writes this proper configuration data to NVRAM 402 of external utility processor 401 (along with a corresponding unique identifier of the partition). Thus, in the event that all cells of a partition are replaced such that the proper configuration data is not found on any of the cells of the partition, the external utility processor 401 may be queried for the proper configuration information for this partition, which may then be stored locally to the nonvolatile memory of each cell of the partition. Use of the external utility processor in this manner does not present a single point of failure. For instance, if the external utility processor fails, the individual partitions 0-K are still capable of configuring themselves (e.g., boot) without requiring any manual intervention from a system administrator as long as every cell of every partition has not also been replaced.

Figure 5:
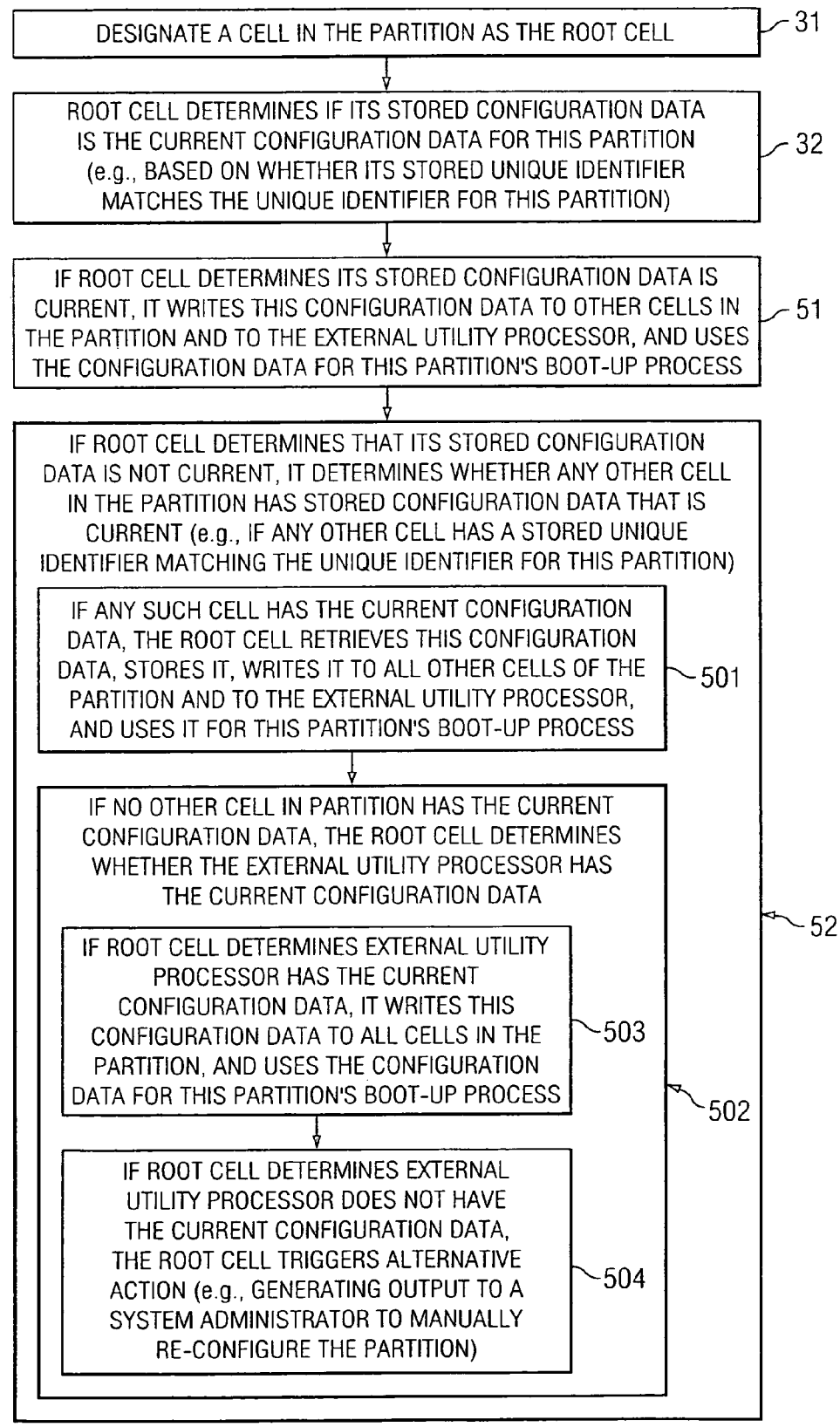
FIG. 5 shows an operational flow diagram for one management technique that may be implemented on the example multi-cell system of FIG. 4.

Turning to FIG. 5, an operational flow diagram for one management technique that may be implemented on the example multi-cell system of FIG. 4 is shown. Operational blocks 31 and 32 correspond to those operational blocks described above in connection with FIG. 3. More specifically, in operational block 31, a cell in a given partition (e.g., Partition 0 in FIG. 4) is designated as a root cell. In operational block 32, the root cell (e.g., Cell 0 in FIG. 4) determines if its stored configuration data (e.g., configuration data $105_B$ in FIG. 4) is the current configuration data for this partition (e.g., based on whether its stored unique identifier $105_A$ matches the calculated identifier for this partition). In block 51, if the root cell determines its stored configuration data is current, it writes this configuration data to other cells in the partition and to the external utility processor 401, and uses the configuration data for this partition's boot-up process. In block 52, if the root cell determines that its stored configuration data is not current, it determines whether any other cell in the partition has stored configuration data that is current (e.g., if any other cell has a stored unique identifier matching the calculated unique identifier for this partition). In block 501, if any such cell has the current configuration data, the root cell retrieves this configuration data, stores the retrieved configuration data to its nonvolatile memory, writes the retrieved configuration data to all other cells of the partition and to external utility processor 401, and uses the retrieved configuration data for this partition's boot-up process.

If, on the other hand, no other cell in the partition has the current configuration data, the root cell determines, in block 502, whether external utility processor 401 has the current configuration data for this partition stored to its respective nonvolatile memory 402. In block 503, if such external utility processor 401 has the current configuration data, the root cell retrieves this configuration data, stores the retrieved configuration data to its nonvolatile memory, writes the retrieved configuration data to all other cells of the partition, and uses the retrieved configuration data for this partition's boot-up process. If, on the other hand, the external utility processor 401 does not have the current configuration data (e.g., if Partition 0 has not previously been configured), the root cell triggers, in block 504, alternative action (e.g., generating output to a system administrator to manually configure the partition).

While the above example embodiment of FIG. 5 utilizes a designated root cell in its management of configuration data, other embodiments do not utilize such a designated root cell. For instance, a round-robin technique for first checking each cell of the partition for the proper configuration data for the partition (e.g., checking whether each cell's stored unique identifier matches the calculated unique identifier for this partition) may be performed, and the external utility processor 401 may then be queried for the proper configuration data if determined that none of the cells of the partition possess such proper configuration data. Alternatively, in certain embodiments, a partition may first attempt to check external utility processor 401 for its proper configuration data, and in a case in which external utility processor 401 does not possess such configuration data (e.g., the external utility processor 401 is failed), the partition utilizes some technique for checking its local cells for its configuration data. Thus, the local management of configuration data within the cells of a partition may be utilized as a backup for the case in which an external utility processor 401 fails. Thus, by maintaining the configuration data for a partition locally in cells of the partition, as described above, the external utility processor 401 does not present a single point of failure.

Suppose now that Cell 0 is included in Partition 0, as in the examples of FIGS. 1 and 4, during a first boot process of Partition 0. Accordingly, Cell 0 receives configuration data $105_B$ for Partition 0 and unique identifier $105_A$ identifying that the configuration data corresponds to Partition 0. Now suppose that Cell 0 is removed from Partition 0 and not re-used in any other partition (e.g., it is simply "shelved"). Suppose further that during the period of time in which Cell 0 is not included in Partition 0, Partition 0 is re-configured such that the configuration information $105_B$ stored to Cell 0 is no longer proper. Now further suppose that Cell 0 is re-inserted into Partition 0. In this scenario, while likely to occur very rarely, an ambiguity may exist between the configuration data $105_B$ of Cell 0 and the remaining cells of Partition 0, while the cells' unique identifiers may each identify that their respective configuration data corresponds to this Partition 0.

Again, the above scenario is such a rare possibility that such an ambiguity may not, in some implementations, be accounted for by the management technique. However, certain embodiments of the management technique is further capable of resolving this type of ambiguity by including timestamp information in the nonvolatile memory of each cell that identifies when the corresponding configuration information of such cell was last stored thereto. Thus, for instance, the timestamp information stored to Cell 0 may be compared to the timestamp information of the other cells, in the above example, to determine that the configuration data of Cell 0 is not as current as that of the other cells and thus the configuration data of one of the other cells may be used in configuring the partition (as well as written to all other cells and updating their respective timestamps). In this sense, timestamp information may include any type of temporal data from which some temporal relationship between a current boot process of the multi-cell system (e.g., partition) and the stored configuration data of a cell can be determined, including without limitation any one or more of date, time, boot cycle number, etc.

While example multi-cell systems have been described above, the techniques described herein for managing configuration data are not limited to those specific multi-cell systems shown and described herein but may likewise be employed on any other desired type of multi-cell system. As one example, the multi-cell system disclosed in U.S. Pat. No. 6,647,508 titled "MULTIPROCESSING COMPUTER ARCHITECTURE WITH MULTIPLE OPERATING SYSTEM INSTANCES AND SOFTWARE CONTROLLED RESOURCE ALLOCATION," the disclosure of which is hereby incorporated herein by reference, may be adapted to implement the configuration data management techniques described herein. As another example, the multi-cell system disclosed in published U.S. Patent Application Number 2002/0124040 titled "NONVOLATILE LOGICAL PARTITION SYSTEM DATA MANAGEMENT," the disclosure of which is hereby incorporated herein by reference, may be advantageously adapted to implement the configuration data management techniques described herein. Various other types of multi-cell systems now known or later developed may likewise implement the configuration data management techniques described herein.

What is claimed is:

1. A method of managing configuration data for a multi-cell computer system, the method comprising:
   storing configuration data for a given multi-cell computer system to nonvolatile memory of at least one cell of said given multi-cell computer system; and
   storing a corresponding identifier to said nonvolatile memory of said at least one cell that uniquely identifies the given multi-cell computer system to which the stored configuration data corresponds.

2. The method of claim 1 wherein said storing configuration data comprises:
   storing said configuration data to said at least one cell during a first boot-up process of said given multi-cell computer system.

3. The method of claim 2 wherein said storing a corresponding identifier comprises:
   storing said identifier that uniquely identifies that said at least one cell received said stored configuration data while a member of said given multi-cell computer system.

4. The method of claim 2 further comprising:
   determining during a second boot-up process of said given multi-cell computer system a unique identifier of said given multi-cell computer system; and
   determining whether the unique identifier stored to any of said at least one cell matches the determined unique identifier of said given multi-cell computer system.

5. The method of claim 4 further comprising:
   if determined that at least one cell's stored identifier matches the determined unique identifier of said given multi-cell computer system, then determining that such cell's stored configuration data is current for the given multi-cell computer system.

6. The method of claim 5 further comprising:
   if determined that at least one cell's stored configuration data is current, using the determined current configuration data for configuring the given multi-cell computer system.

7. The method of claim 5 further comprising:
   if determined that at least one cell's stored configuration data is current, storing the determined current configuration data for the given multi-cell computer system to other cells of said given multi-cell computer system.

8. The method of claim 5 further comprising:
   if determined that at least one cell's stored configuration data is current, updating the other cells' stored identifier to match the determined unique identifier of said given multi-cell computer system.

9. The method of claim 1 wherein said given multi-cell computer system is a partition of a multi-cell computer system, said partition having a plurality of the cells of said multi-cell computer system.

10. The method of claim 1 wherein said configuration data comprises at least one item selected from the group consisting of:
    information identifying a boot path for said given multi-cell computer system, information identifying a device to use as a system console for said given multi-cell computer system, information identifying any tests to run when booting up the given multi-cell computer system, and information identifying resources of said given multi-cell computer system.

11. A method of managing configuration data locally within a partition of a multi-cell computer system comprising:
    determining a unique identifier for a given partition of the multi-cell computer system;
    determining if at least one cell in said given partition has an identifier stored to its respective nonvolatile memory that matches said determined unique identifier for said given partition; and
    if determined that at least one cell of said given partition has a stored identifier matching said determined unique identifier for said given partition, using configuration data stored to that cell's nonvolatile memory for configuring the given partition.

12. The method of claim 11 wherein at least one cell of said given partition comprises configuration data stored to its respective nonvolatile memory that is not proper configuration data for configuring the given partition.

13. The method of claim 11 wherein said configuration data comprises at least one selected from the group consisting of:
    information identifying a boot path for said given partition, information identifying a device to use as a system console for said given partition, information identifying any tests to run when booting up the given partition, and information identifying resources of said given partition.

14. The method of claim 11 further comprising:
    if determined that at least one cell of said given partition has a stored identifier matching said determined unique identifier for said given partition, storing the configuration data of said at least one cell whose stored identifier matches said determined unique identifier to nonvolatile memory of other cells of said given partition.

15. The method of claim 14 further comprising:
    storing an identifier that matches the determined unique identifier of said given partition to said nonvolatile memory of said other cells.

16. A method comprising:
    storing configuration data for a multi-cell computer system locally to nonvolatile memory of each of a plurality of cells, wherein said storing configuration data comprises storing corresponding identifier data that uniquely identifies a multi-cell system to which the configuration data corresponds;
    implementing the plurality of cells in a given multi-cell system; and
    determining if any of said cells possess the proper configuration data corresponding to the given multi-cell system.

17. The method of claim 16 wherein said determining comprises:
    said given multi-cell system autonomously determining if any of said cells possess the proper configuration data.

18. The method of claim 16 wherein said determining comprises:
    calculating a unique identifier of said given multi-cell system; and
    determining if a stored identifier in said nonvolatile memory of any one of said plurality of cells matches the calculated unique identifier.

19. The method of claim 16 wherein said storing configuration data comprises:
- storing configuration data for a first multi-cell system to a first one of said plurality of cells; and
- storing configuration data for a second multi-cell system to a second one of said plurality of cells.

20. The method of claim 16 wherein said multi-cell system is a partition of a computer system.

21. The method of claim 20 further comprising:
- storing said configuration data for said partition to a utility processor that is external to said partition.

22. A method of managing configuration data for a multi-cell system having a plurality of cells under the control of a common operating system, the method comprising:
- during a boot-up process of the multi-cell system, a first cell determining whether it has stored in its non-volatile memory current configuration data for the multi-cell system;
- if determined that the first cell has the current configuration data, the first cell providing this stored configuration data to other cells of said multi-cell system and using this stored configuration data for configuring the multi-cell system; and
- if determined that the first cell does not have the current configuration data, determining if any cell of said multi-cell system has stored in its non-volatile memory the current configuration data for the system, and if determined that a cell of said multi-cell system has said current configuration data, then providing this configuration data to other cells of said multi-cell system and using this stored configuration data for configuring the multi-cell system.

23. The method of claim 22 wherein said first cell determining whether it has stored in its non-volatile memory current configuration data for the multi-cell system further comprises:
- determining whether an identifier stored to said first cell's non-volatile memory matches a unique identifier of the multi-cell system.

24. The method of claim 22 wherein said multi-cell system is a partition having said plurality of cells under the control of a common operating system.

25. A method comprising:
- during a first boot-up process of a multi-cell partition, distributing configuration data for the multi-cell partition to each of the cells of said multi-cell partition, wherein the configuration data is stored to non-volatile memory in each of the cells, and storing to said non-volatile memory of each cell a corresponding identifier that identifies that the configuration data corresponds to said multi-cell partition; and
- during a second boot-up process of said multi-cell partition, a first one of the cells included therein determining whether a unique identifier for the multi-cell partition matches with the first cell's stored identifier, wherein if the first cell's stored identifier matches the unique identifier of the multi-cell partition, then determining that the configuration data stored to non-volatile memory of said first cell is the current configuration data for configuring the multi-cell partition.

26. The method of claim 25 further comprising:
- between said first boot-up process and said second boot-up process, replacing said first one of the cells with a different cell having different configuration data stored to its respective non-volatile memory; and
- said different cell determining during said second boot-up process that its stored identifier does not match the unique identifier for the multi-cell partition.

27. The method of claim 25 wherein said first one of the cells is a designated root cell of the partition.

28. The method of claim 25 wherein a round-robin approach is utilized within the multi-cell partition such that if said first cell does not have a stored identifier matching the unique identifier of the multi-cell partition, a second cell of said multi-cell partition determines whether it has a stored identifier matching the unique identifier of the multi-cell partition.

29. A system comprising:
- a plurality of cells in a multi-cell system, wherein multiple ones of said cells include non-volatile memory to which are stored configuration data and a corresponding identifier that uniquely identifies a given multi-cell partition to which the cell's respective stored configuration data corresponds.

30. The system of claim 29 wherein at least one cell of said multi-cell system is operable to determine whether its stored identifier matches a unique identifier of said multi-cell system.

31. The system of claim 30 wherein if said at least one cell determines that its stored identifier matches said unique identifier of said multi-cell system, then said at least one cell is operable to identify its corresponding stored configuration data as the proper configuration data for configuring said multi-cell system.

32. The system of claim 29 wherein each of said cells include non-volatile memory to which are stored configuration data and a corresponding identifier that uniquely identifies a given multi-cell partition to which the cell's respective stored configuration data corresponds.

33. A system comprising:
- non-volatile storage means, on each of a plurality of cells of a particular multi-cell partition, for storing configuration data;
- non-volatile storage means, on each of said plurality of cells, for storing an identifier that uniquely identifies a multi-cell system to which the cell's respective stored configuration data relates; and
- means, on at least one of said plurality of cells, for determining if said configuration data stored to any of said plurality of cells relates to said particular multi-cell partition.

34. The system of claim 33 wherein said means for determining comprises:
- means for determining whether a unique identifier of said particular multi-cell partition matches said at least one cell's stored identifier.

35. The system of claim 34 further comprising:
- means for using the configuration data of a cell determined to have a stored identifier that matches said unique identifier of said particular multi-cell partition for configuring the particular multi-cell partition.

* * * * *

UNITED STATES PATENT AND TRADEMARK OFFICE
CERTIFICATE OF CORRECTION

PATENT NO.         : 7,451,302 B2                               Page 1 of 1
APPLICATION NO. : 10/797530
DATED              : November 11, 2008
INVENTOR(S)        : Scott Lynn Michaelis et al.

It is certified that error appears in the above-identified patent and that said Letters Patent is hereby corrected as shown below:

In column 10, line 45, delete "$100_B$" and insert -- $110_B$ --, therefor.

In column 12, line 31, delete "10" and insert -- 110 --, therefor.

Signed and Sealed this

Second Day of June, 2009

JOHN DOLL
*Acting Director of the United States Patent and Trademark Office*